United States Patent
Beukema et al.

(10) Patent No.: US 7,296,108 B2
(45) Date of Patent: Nov. 13, 2007

(54) APPARATUS AND METHOD FOR EFFICIENT TRANSMISSION OF UNALIGNED DATA

(75) Inventors: Bruce Leroy Beukema, Hayfield, MN (US); Jamie Randall Kuesel, Rochester, MN (US); Robert Allen Shearer, Rochester, MN (US); Charles David Wait, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 11/138,837

(22) Filed: May 26, 2005

(65) Prior Publication Data

US 2006/0271721 A1 Nov. 30, 2006

(51) Int. Cl.
*G06F 13/42* (2006.01)
*G06F 12/04* (2006.01)
*G06F 9/315* (2006.01)

(52) U.S. Cl. .............. 710/307; 711/201; 712/204

(58) Field of Classification Search ............. 710/306, 710/307, 310, 311, 29, 30, 65, 105; 711/201; 712/204

See application file for complete search history.

(56) References Cited

U.S. PATENT DOCUMENTS

| | | | | |
|---|---|---|---|---|
| 5,519,842 A | * | 5/1996 | Atallah et al. | 711/202 |
| 5,680,642 A | * | 10/1997 | Johnson | 710/33 |
| 5,784,110 A | * | 7/1998 | Acampora et al. | 375/240.23 |
| 6,009,510 A | * | 12/1999 | Henry et al. | 712/204 |
| 6,145,017 A | * | 11/2000 | Ghaffari | 710/5 |
| 6,681,273 B1 | * | 1/2004 | Allen et al. | 710/52 |
| 6,772,311 B2 | * | 8/2004 | Deng | 711/168 |
| 6,886,058 B2 | * | 4/2005 | Haren | 710/65 |
| 6,965,606 B2 | * | 11/2005 | Bhardwaj | 370/428 |
| 7,107,584 B2 | * | 9/2006 | Bond et al. | 717/151 |
| 2002/0184412 A1 | * | 12/2002 | Stevens et al. | 710/30 |
| 2005/0144416 A1 | * | 6/2005 | Lin | 711/201 |

OTHER PUBLICATIONS

"Method for Handling Unaligned Operands that Extend Across Memory Protection Boundaries in a Microprocessor", IBM Technical Disclosure Bulletin, Apr. 1, 1994, Volume No. 37, Issue No. 4B, Page No. 597-598.*

* cited by examiner

*Primary Examiner*—Glenn A. Auve
*Assistant Examiner*—Trisha Vu
(74) *Attorney, Agent, or Firm*—Martin & Associates LLC; Derek P. Martin

(57) ABSTRACT

An apparatus and method to transmit unaligned data over an interface bus while providing the appearance of aligned data transfers to the receiving processor. In a preferred embodiment, an alignment mechanism is provided in the bus interface of the receiving processor to align the data transfers transparent to the receiving processor. The alignment mechanism detects an unaligned transfer in the bus command queue and forms multiple commands of aligned data to send to the processor.

7 Claims, 4 Drawing Sheets

|   | 0 | 1 | 2 | 3 | 4 | 5 | 6 | 7 |   |
|---|---|---|---|---|---|---|---|---|---|
510|   |   |   |   |   | X | X | X | X | 1st Transfer
520| X | X | X | X |   |   |   |   |   | 2nd Transfer

FIG. 5
(Prior Art)

|   | 0 | 1 | 2 | 3 | 4 | 5 | 6 | 7 | 8 | 9 | 10 | 11 | 12 | 13 | 14 | 15 |   |
|---|---|---|---|---|---|---|---|---|---|---|----|----|----|----|----|----|---|
610|   |   |   |   | X | X | X | X | X | X | X  | X  |    |    |    |    | Single Transfer

FIG. 6

APPARATUS AND METHOD FOR EFFICIENT TRANSMISSION OF UNALIGNED DATA

BACKGROUND OF THE INVENTION

1. Technical Field

This invention generally relates to computer systems, and more specifically relates to apparatus and methods for efficient transmission of unaligned data over a bus in a computer system.

2. Background Art

In computer systems, data is often transferred between processors, memories, peripheral devices and other computer processor systems via an input/output (I/O) bus. Standardized buses are used in computer systems to provide a common I/O interface to peripherals across different platforms and different processors.

Standardized buses often suffer from problems of data alignment. Un-alignment occurs when a block of data bytes is not aligned to a word or double word boundary at the source and/or the destination. Such misalignment can incur significant processor or device overhead in shifting and/or masking the block of bytes during the transfer, at the source or at the destination. Data may be sent across the bus in aligned or unaligned transfers.

FIG. 2 shows a block diagram of a computer system according to the prior art. Computer system 200 includes a first processor 210 that is connected to a second processor 220. A bus interface 230 connects the first processor 210 to a bus 240. A second bus interface 250 connects the second processor 220 to the bus 240. The bus 240 transfers data packets of aligned data from the first processor 220 to the second processor 220. Data that originates as unaligned data is converted to multiple transfers of aligned data before being sent over the bus 240. This data conversion is typically done by the processor in store gathering operations.

In some computer systems data transfer is more efficient when sending the unaligned data. This sometimes occurs due to the overhead in sending serial data in multiple transfers. In a system where the data is sent unaligned to enhance throughput on the bus, on the same system it may be more efficient for the processor to receive aligned data or the receiver processor and/or hardware may be configured to require aligned data.

Without a method and apparatus for optimizing unaligned transfers of data between processors or other bus devices, the computer industry will continue to suffer from excessive delays in data transfer and/or reduced performance.

DISCLOSURE OF INVENTION

In accordance with the preferred embodiments, an apparatus and method is described to transmit unaligned data over an interface bus while providing the appearance of aligned data transfers to the receiving processor. In a preferred embodiment, an alignment mechanism is provided in the bus interface of the receiving processor to align the data transfers transparent to the receiving processor. The alignment mechanism detects an unaligned transfer in the bus command queue and forms multiple commands of aligned data to send to the processor.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 5 is an example of the transfer of unaligned data in accordance with the prior art;

FIG. 6 is an example of the transfer of unaligned data in accordance with a preferred embodiment;

BEST MODE FOR CARRYING OUT THE INVENTION

1.0 Overview

The present invention relates to optimizing transfer of unaligned data over a databus. For those not familiar with the transfer of unaligned data, this Overview section provides background information that will help to understand the present invention.

Aligned and Unaligned Transfers

Figure 3:
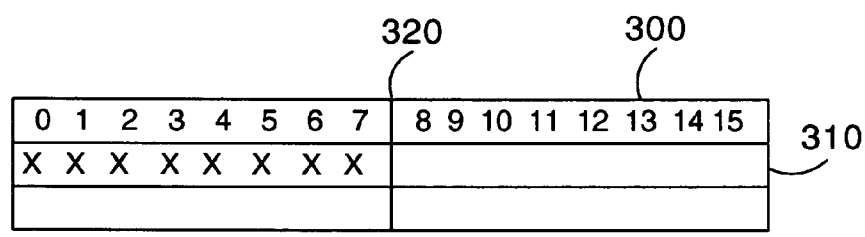
FIG. 3 is an example of aligned data in accordance with the prior art.
Figure 4:
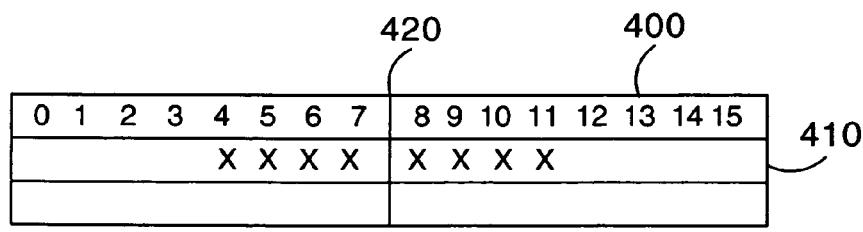
FIG. 4 is an example of unaligned data in accordance with the prior art.

FIGS. 3 and 4 are examples that illustrate the difference between aligned and unaligned data transfers. FIG. 3 shows an aligned transfer; and FIG. 4 shows an unaligned transfer. In FIGS. 3 and 4, each "x" represents a byte of data within the boundaries of a 16 byte (0 though 15) packet indicated by the numbered positions of the packet.

FIG. 3 illustrates an aligned transfer of data. As shown, the 8-bytes of data 310 are aligned with the 8 byte boundary 320 of the 16 byte data packet 300. Thus, this transfer maintains the byte alignment of the data as it is transferred. In contrast FIG. 4 illustrates an example of an unaligned transfer of data. As shown, the 8 bytes of data 410 are not aligned to the 8 byte boundary 420 in the packet 400.

Figures 5, 6:
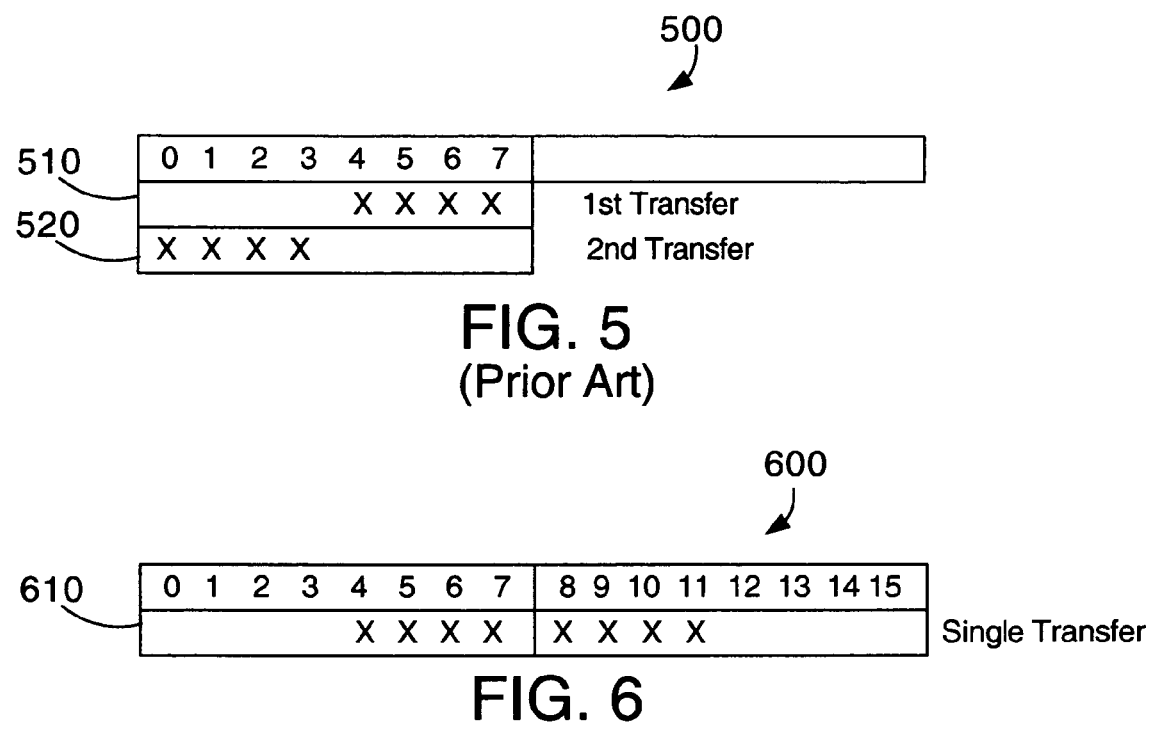

In some prior art data systems, the unaligned data was broken up into multiple commands. FIG. 5 illustrates a prior art system where an unaligned data packet as shown in FIG. 4 is transferred as multiple commands. A first command 510 sends 4 packets of data in a first transfer, and a second command 520 sends 4 packets of data in a second transfer. In this way, there is no data sent unaligned.

2.0 Detailed Description

The preferred embodiments provide an apparatus and method to transmit unaligned data over an interface bus while providing the appearance of aligned data transfers to the receiving processor. In the below described preferred embodiment, an alignment mechanism is provided in the bus interface of the receiving processor to align the data transfers transparent to the receiving processor. The alignment mechanism detects an unaligned transfer in the bus command queue and forms multiple commands of aligned data to send to the processor.

In contrast to some prior art data systems where unaligned data was broken up into multiple commands, the preferred embodiments herein transfer the data unaligned. FIG. 6 illustrates a data transferred according to a preferred embodiment where an unaligned data packet as shown in FIG. 4 is transferred as a single command 610.

Figure 1:
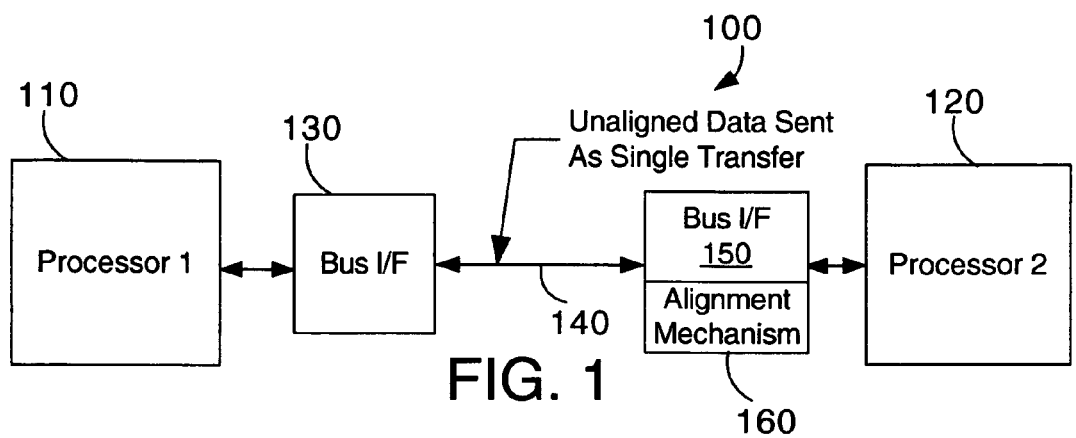
FIG. 1 is a computer system in accordance with the preferred embodiments.
Figure 2:
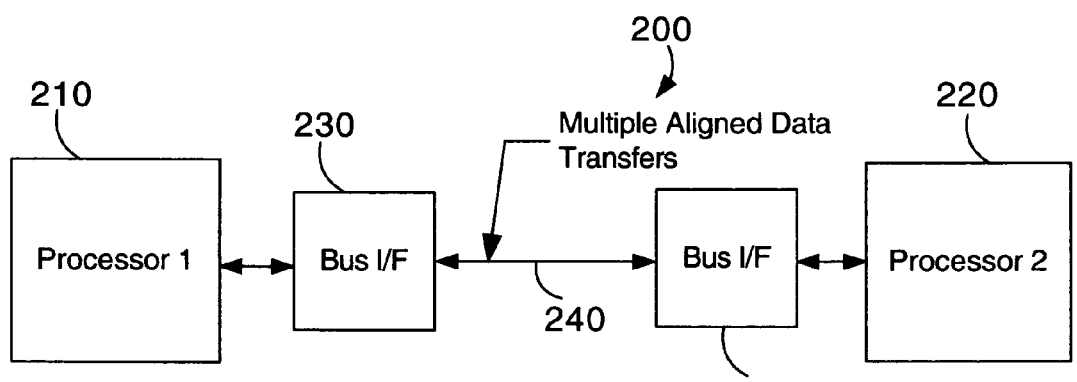
FIG. 2 is a computer system in accordance with the prior art.

Referring now to FIG. 1, a computer system 100 is represented which incorporates unaligned transfers of data in accordance with the preferred embodiments claimed herein. Computer system 100 includes a first processor 110 that is connected to a second processor 120. A bus interface 130 connects the first processor 110 to the bus 140. A second bus interface 150 connects the second processor 120 to the bus 140. The bus 140 transfers data packets of unaligned data from the first processor 110 to the second processor 120. Data that originates as unaligned data is sent as unaligned data over the bus 140. A processor as used herein could include a memory controller, a video controller, a graphics processor or similar device that processes data from a data bus.

Again referring to FIG. 1, the bus interface 150 for the receiving processor 120 includes an alignment mechanism 160. The alignment mechanism 160 includes circuitry to align the data transfers transparent to the receiving processor 120. The alignment mechanism 160 detects an unaligned transfer and forms multiple commands of aligned data to send to the processor.

Figure 7:
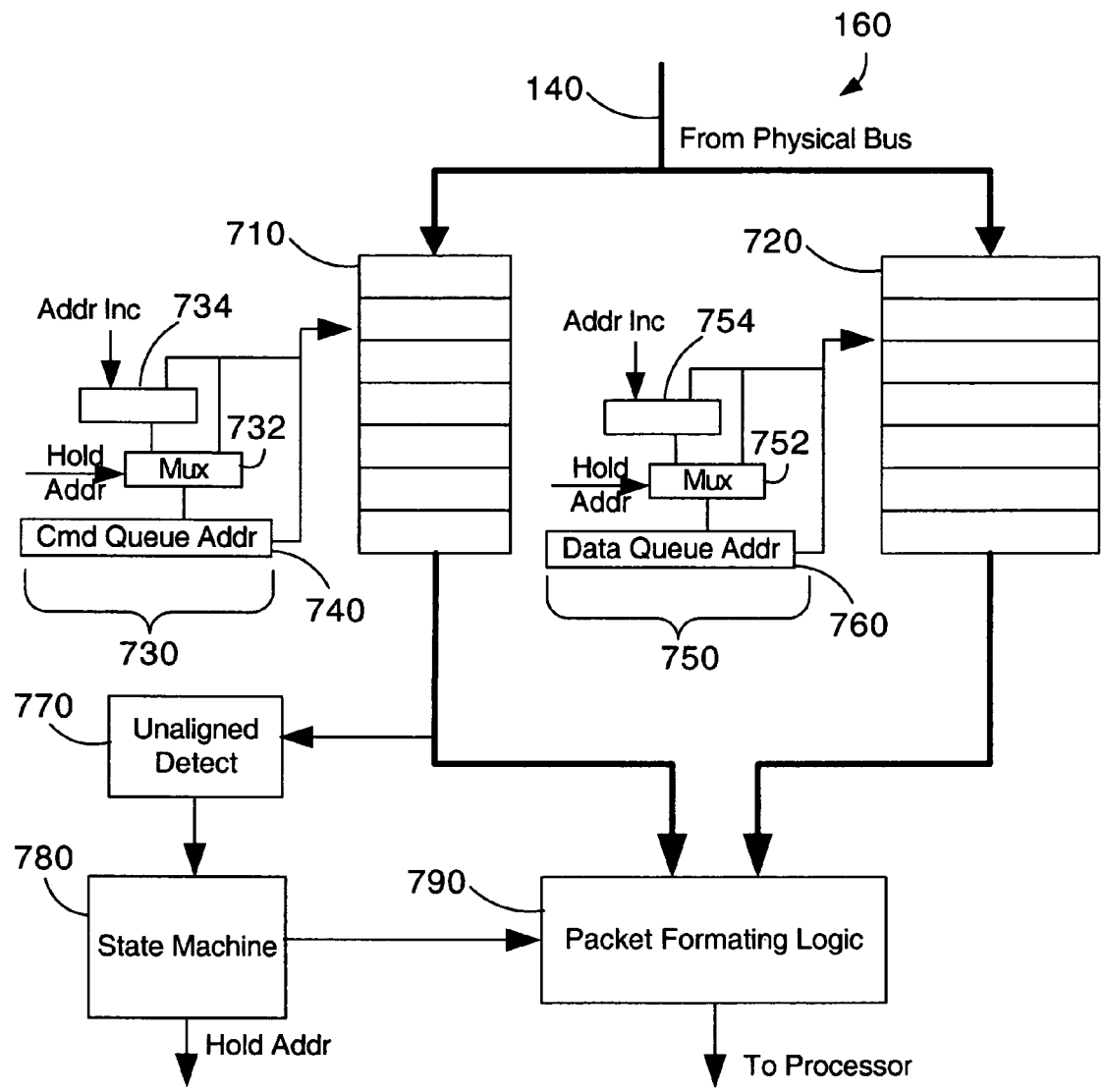
FIG. 7 shows a block diagram of the alignment mechanism shown in FIG. 1 in accordance with a preferred embodiment.

FIG. 7 illustrates a logic block diagram of the alignment mechanism 160. Alignment mechanism 160 has a command queue 710 and a data queue 720 to store the command and data information sent over the bus 140. A command pointer circuit 730 controls a command queue address 740 that points to the current command being processed in the command queue 710. Similarly, a data pointer circuit 750 controls a data queue address 760 that points to the current data being processed in the data queue 720. When a new command is processed from the command queue 710, unaligned detect logic 770 determines whether the command was sent over the bus as an unaligned command. When the unaligned detect logic 770 detects an unaligned command it notifies a state machine 780.

The state machine 780 of the alignment mechanism 160 uses the address and length of the command being processed to determine how to format a first packet to send to the processor. The packet formatting logic 790 is used by the state machine 780 to form the new packet to be sent. The state machine then holds the command queue address 740 and the data queue address 760 using the Hold Addr signal into the command pointer circuit 730 and the address pointer circuit 750. The state machine then formats the data for the second packet to be sent to the processor. The state machine uses the same command and data as used for the first data packet in conjunction with the packet format logic to build the second packet sent to send to the processor (120 in FIG. 1).

The command pointer circuit 730 that controls the command queue address 740 includes a multiplexer (mux) 732. The multiplexer 732 selects between the same address currently held in the command queue address 740 or an incremented command queue address depending on the state of the hold address signal from the state machine 780. The incremented address is made available to the multiplexer 732 by an address increment register 734. Similarly, the data pointer circuit 750 includes a multiplexer 752 that selects between the same address currently held in the data queue address 760 or an incremented data queue address depending on the state of the hold address signal from the state machine 780. The incremented address is made available to the multiplexer 752 by an address increment register 754.

Again referring to FIG. 7, an example of the alignment mechanism 160 processing an unaligned write will be explained. Data packets arrive on bus 140 from the sending processor (shown in FIG. 1). The command portion of the packet is stored in the command queue 710. The data portion of the packet is stored in the data queue 720. A state machine 780 controls the processing of the packets in the command queue 710 and data queue 720 to send to the receiving processor (shown in FIG. 1). The next command to be processed is stored in the command queue 710 at the location pointed to by the command queue address 740. Similarly, the next data is stored in the data queue 720 at the location pointed to by the data queue address 750. When a new command is processed from the command queue 710, the unaligned detect logic 770 determines whether the command was sent over the bus as an unaligned command. If the packet was sent unaligned, the state machine 780 signals the packet formatting logic 790 to format the packet into multiple packets with aligned data. The state machine 780 uses the command pointer circuit 730 to hold the command queue address 740 to point at the unaligned command to make the multiple packets as described above.

Figure 8:
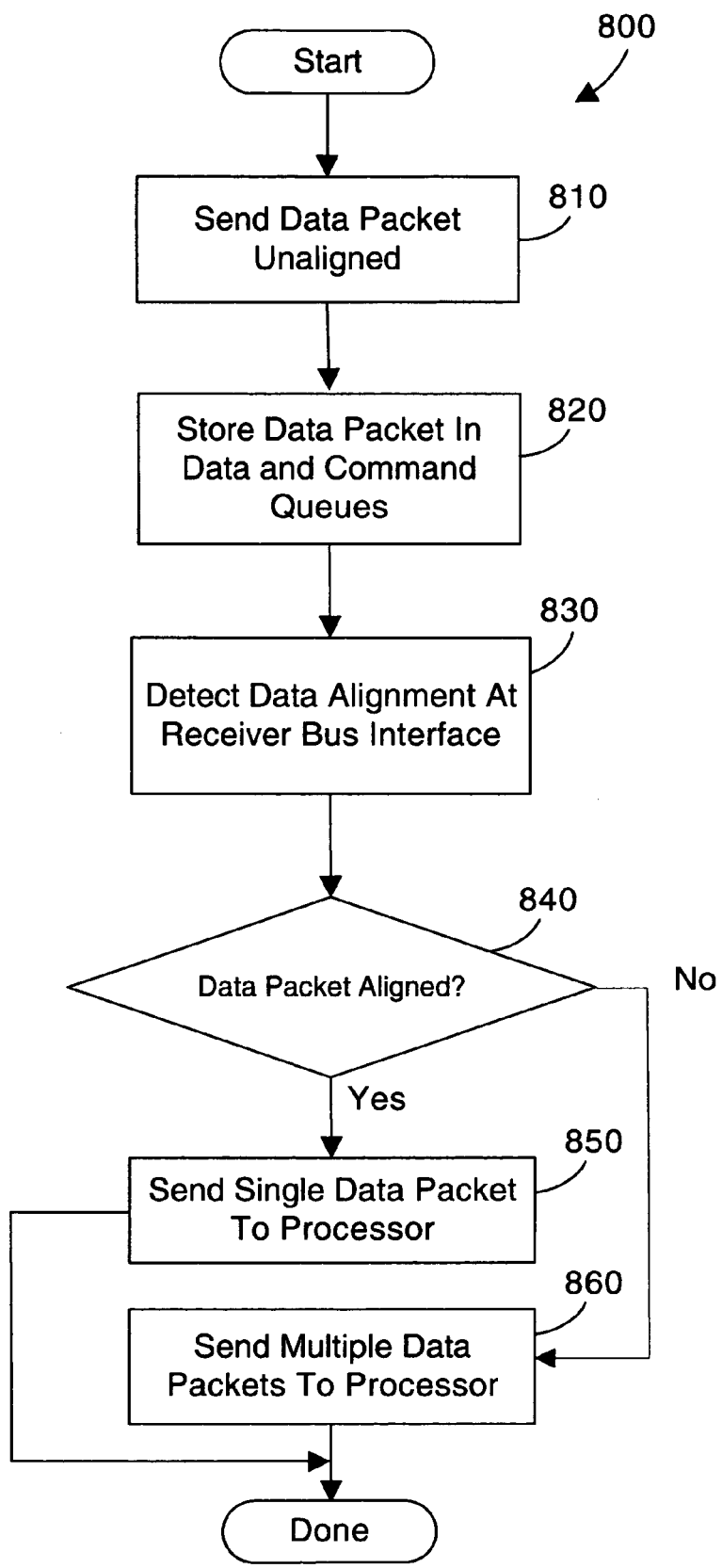
FIG. 8 shows a method for transferring unaligned data in accordance with a preferred embodiment.

Referring now to FIG. 8, method 800 shows the steps for transferring an unaligned data packet in accordance with the preferred embodiments. Method 800 begins by sending data unaligned over a bus between two or more processors or other computer systems as described above (step 810). The data is then received by a bus interface for one of the processors and stored in a data queue and a command queue (step 820). A logic circuit at the receiver bus interface detects unaligned commands (step 830). For each command in the command queue that was sent unaligned, a state machine or other suitable logic circuit determines if the command is aligned (step 840). If the command was sent aligned (step 840=yes) then the command is passed to the processor as it was sent (step 850) and the method is then done. If the command was sent unaligned (step 840=no) then the command is reformatted and passed to the processor in multiple commands (step 860) and the method is then done.

The present invention as described with reference to the preferred embodiments provides significant improvements over the prior art. The present invention provides a way to transmit unaligned data over an interface bus while providing the appearance of aligned data transfers to the receiving processor. The preferred embodiments provide a method and apparatus for optimizing unaligned transfers of data between processors or other bus devices, to provide reduced delays in data transfer and/or increased performance.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, the bus alignment mechanism could be implemented in software of a processor located in the bus interface in the receiver system.

What is claimed is:

1. A computer system comprising:
   a first processor with a first bus interface;
   a bus coupled to the first bus interface;
   a second bus interface coupled to the bus;
   a bus alignment circuit in hardware for the second bus interface that converts data bus commands received from the bus with unaligned data from the first processor to multiple bus commands with aligned data;

wherein the bus alignment circuit sends the multiple bus commands to a second processor coupled to the second bus interface and wherein conversion of the bus commands to aligned data is transparent to the second processor; and wherein the bus alignment circuit further comprises a command pointer circuit with a command queue address pointer that points to the next command to process and a multiplexer that selects a next command pointer from the command queue address pointer and an incremented command queue address pointer depending on the state of a hold address signal from a state machine.

2. The computer system of claim 1 wherein the bus alignment circuit further comprises a command queue to hold the commands of data packets received over the bus and a data queue to hold data from the data packets.

3. The computer system of claim 1 wherein the bus alignment circuit further comprises a bus alignment detection circuit to detect unaligned commands in the command queue.

4. The computer system of claim 1 wherein the bus alignment circuit further comprises the state machine to reformat unaligned commands into multiple commands with aligned data using packet reformatting logic.

5. A computer system comprising:
a first processor with a first bus interface;
a bus coupled to the first bus interface;
a second bus interface coupled to the bus;
a bus alignment mechanism in the second bus interface that converts data bus commands received from the bus with unaligned data from the first processor to multiple bus commands with aligned data;

wherein the bus alignment mechanism sends the multiple bus commands to a second processor coupled to the second bus interface and wherein the second processor transparently receives the multiple bus commands with aligned data; wherein the bus alignment mechanism comprises a state machine to reformat unaligned commands into multiple commands with aligned data using packet reformatting logic; and wherein the bus alignment mechanism further comprises a command pointer circuit with a command queue address pointer that points to the next command to process and a multiplexer that selects a next command pointer from the command queue address pointer and an incremented command queue address pointer depending on the state of a hold address signal from the state machine.

6. The computer system of claim 5 wherein the bus alignment mechanism further comprises a command queue to hold the bus commands of data packets received over the bus from the first processor and a data queue to hold data from the data packets.

7. The computer system of claim 6 wherein the bus alignment mechanism further comprises a bus alignment detection circuit to detect unaligned commands in the command queue.

* * * * *